United States Patent [19]

Taguchi et al.

[11] Patent Number: 5,267,541
[45] Date of Patent: Dec. 7, 1993

[54] CONTROL DEVICE FOR A VARIABLE DISPLACEMENT ENGINE

[75] Inventors: Yoshinori Taguchi, Kariya; Yukihisa Oda, Chiryu; Tokihiko Akita, Toyoake; Masaru Shimizu, Toyota; Toru Fujikawa, Obu, all of Japan

[73] Assignee: Aisin Seiki Kabushiki Kaisha, Kariya, Japan

[21] Appl. No.: 828,497

[22] Filed: Jan. 31, 1992

[30] Foreign Application Priority Data

Jan. 31, 1991 [JP] Japan .................................. 3-10857

[51] Int. Cl.⁵ ............................................. F02D 13/06
[52] U.S. Cl. ............................................. 123/198 F
[58] Field of Search ................................. 123/198 F

[56] References Cited

U.S. PATENT DOCUMENTS 4,080,947 3/1978 Iizuka ........................ 123/198 F
4,144,864 3/1979 Kato et al. ................. 123/198 F

OTHER PUBLICATIONS

"Mitsubishi Modulated Engine", Automotive Engineer vol. 7, No. 2, pp. 37, 38, Apr. 1982.

*Primary Examiner*—Noah P. Kamen
*Attorney, Agent, or Firm*—Oblon, Spivak, McClelland, Maier & Neustadt

[57] ABSTRACT

A control system for a variable displacement engine for an automobile changes a number of the cylinders of the engine when an engine load changes. The system sets an amendment value to a throttle valve opening in accordance with a throttle valve opening and an engine revolution. The system controls the throttle valve before the system changes a number of the cylinders. Thus the throttle valve is controlled to obtain the same torque before and after the change of the number of the cylinders.

6 Claims, 5 Drawing Sheets

CONTROL DEVICE FOR A VARIABLE DISPLACEMENT ENGINE

BACKGROUND OF THE INVENTION

1. Field of the Invention

The present invention relates to a control device for a variable displacement engine for an automobile.

2. Description of the Prior Art

It is generally better for a fuel efficiency when the engine operates in a high load condition. A variable displacement engine is known to cut a fuel delivery off to a certain number of the cylinders so that the engine keeps a high load condition. Conventional control devices for a variable displacement engine are shown in Japanese Patent Laid Open 56-28216 (1981) and 55-131540 (1980). However, a torque difference occurring at a time of change of the number of the cylinders causes a shock.

Japanese Patent Laid Open 59-141740 (1984) shows a system that has an automatic transmission control device to control an output of the automatic transmission in accordance with an engine revolution and an accelerator pedal operation. However, this control device still can not control an abrupt change of torque.

SUMMARY OF THE INVENTION

Accordingly, one of the objects of the present invention is to produce a control device for a variable displacement engine to obviate the above drawbacks.

Another object of the present invention is to produce a control device for a variable displacement engine which can control an output torque of the engine to reduce a shock.

To achieve the above objects, and in accordance with the principles of the invention as embodied and broadly described herein, a control system for a variable displacement engine for an automobile has means for setting an amendment value to a throttle valve opening in accordance with a throttle valve opening and an engine revolution.

In accordance with the above mentioned control device for a variable displacement engine, the system sets an amendment value to a throttle valve opening before the system changes a number of the cylinders and controls the throttle valve. Thus the throttle valve is controlled to obtain the same torque before and after the change of the number of the cylinders.

BRIEF DESCRIPTION OF THE DRAWING

For a full understanding of the true scope of the invention, the following detailed description should be read in conjunction with the drawing, wherein.

DETAILED DESCRIPTION OF THE PREFERRED EMBODIMENTS

In the following, preferred embodiments of the present invention will be described with reference to the drawings.

Figure 1:
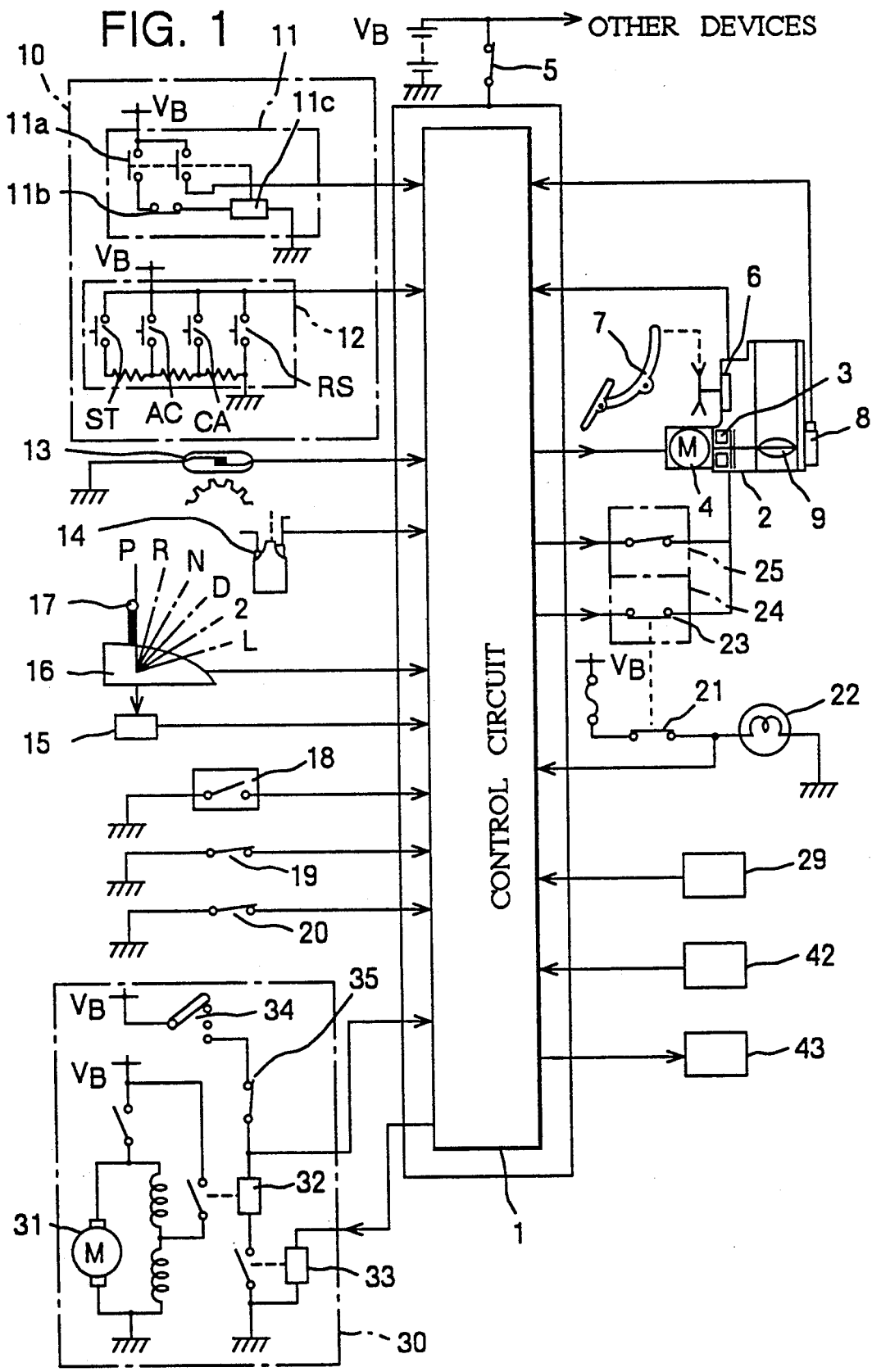
FIG. 1 is a block diagram of a control device for a variable displacement engine of the present invention.

FIG. 1 shows a block diagram of a control device for a variable displacement engine of the present invention.

Referring to FIG. 1, a control circuit 1 is a microcomputer which receives signals from the sensors and outputs the control signals. The control circuit 1 is connected to a power source VB through an ignition switch 5. A coil 3 and a motor 4 of an electric magnetic clutch mechanism 2 for throttle control is also connected to the control circuit 1. An accelerator sensor 6 sends a signal corresponding to an accelerator pedal 7 to the control circuit 1. The control circuit 1 controls the clutch mechanism 2 and the motor 4 to control the throttle valve 9 of an air intake system in accordance with the driving conditions.

Cruise control switches 10 are connected to the control circuit 1. The cruise control switches 10 includes a power switch 11 and control switches 12. When the power switch 11 is turned on while driving, the speed is memorized by operating the set switch ST of the control switches 12. The system keeps the vehicle running at the memorized speed. An acceleration switch AC is used for adjusting the memorized speed. The memorized speed is increased while the acceleration switch AC is operated. On the other hand, the memorized speed is decreased while the set switch ST is operated. A cancel switch CA is used for canceling the cruise control. A resume switch RS is used for calling the memorized speed back once the cruise control is canceled.

A speed sensor 13 is an electric magnetic pick-up sensor. An igniter 14 is connected to the control circuit 1 to input the engine revolution.

A transmission controller 15 is connected to the control circuit 1. The transmission controller 15 controls an automatic transmission 16 in accordance with the signals from the speed sensor 13 and the throttle sensor 8. The automatic transmission 16 has a shift lever 17 which changes the operation of the transmission 16. The operations are; parking range (P range), neutral range (N range), driving range (D range), second range (2 range) and low range (L range). A shift switch detects the position of the shift lever 17 and sends the signal to the transmission controller 15 and the control circuit 1. A mode change switch 18 sets driving conditions such as power driving or economy driving. The relations between the accelerator 7 and the throttle valve 9 are decided in accordance with the maps memorized in a memory. An anti-slip control switch 19 prohibits the anti-slip control if the driver does not like it. A steering sensor 20 detects the steering angle for the anti-slip control. A brake switch 21 operates with the brake pedal to power on a brake light 22 and opens the circuit 24 to cancel the cruise control. An engine torque sensor 29 is placed at the engine output shaft. A vacuum switch 42 is connected to an input terminal of the control circuit 1. An oil control valve 43 is connected to an output terminal of the control circuit 1. The oil control valve 43 operating with the intake exhaust valve shuts off the fuel to the engine. A starter circuit 30 controls the second relay 33 connected to the first relay 32 to energize a starter motor 31. A starter switch 34 is connected to the first relay 32. A neutral switch 35 is connected between the starter switch 34 and the first relay 32. The neutral switch 35 is turned on while the automatic transmission 16 is in the neutral position so that the starter motor 31 is turned on if the starter switch 34 is turned on.

Figure 2:
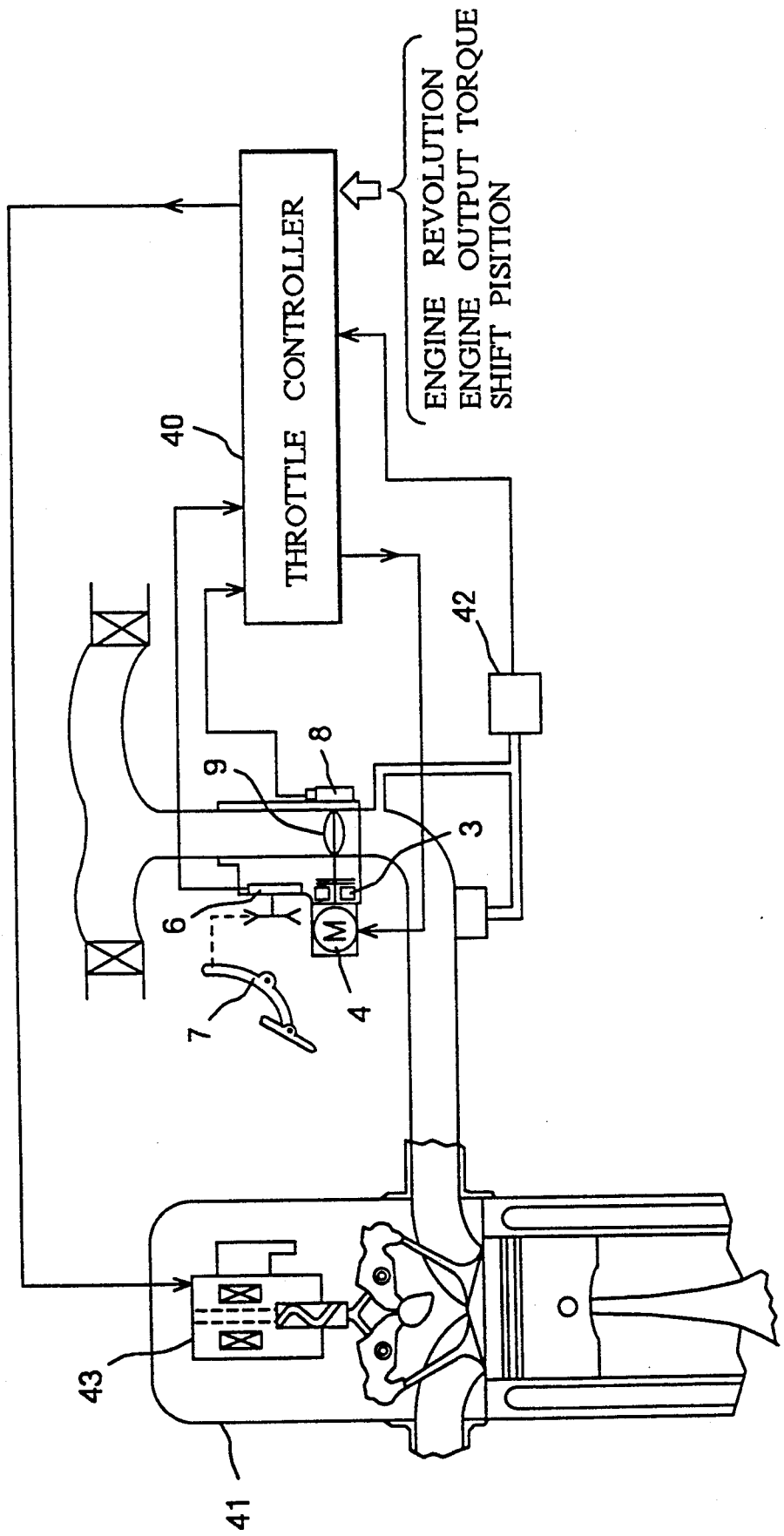
FIG. 2 is a drawing which shows a control device for a vehicle displacement engine of the present invention.

FIG. 2 is a drawing which shows a control device for a vehicle displacement engine of the present invention.

Referring to FIG. 2, a throttle controller 40 controls the motor 4 for the throttle valve 9 of the air intake system in accordance with the signals of the accelerator switch 6 and the throttle sensor 8. The vacuum switch 42 detects a condition of the engine 41 and sends the signal to the throttle controller 40. The throttle controller 40 receives the signals from the engine torque sensor 29, the shift position sensor 17 of the automatic transmission 16, the transmission controller 15, the speed sensor 13 and the igniter 14 as an engine revolution sensor. The throttle controller 40 controls the oil control valve 43 to change the engine operation i.e., to selectively deactivate a cylinder by holding the intake and exhaust valve open.

Figure 3:
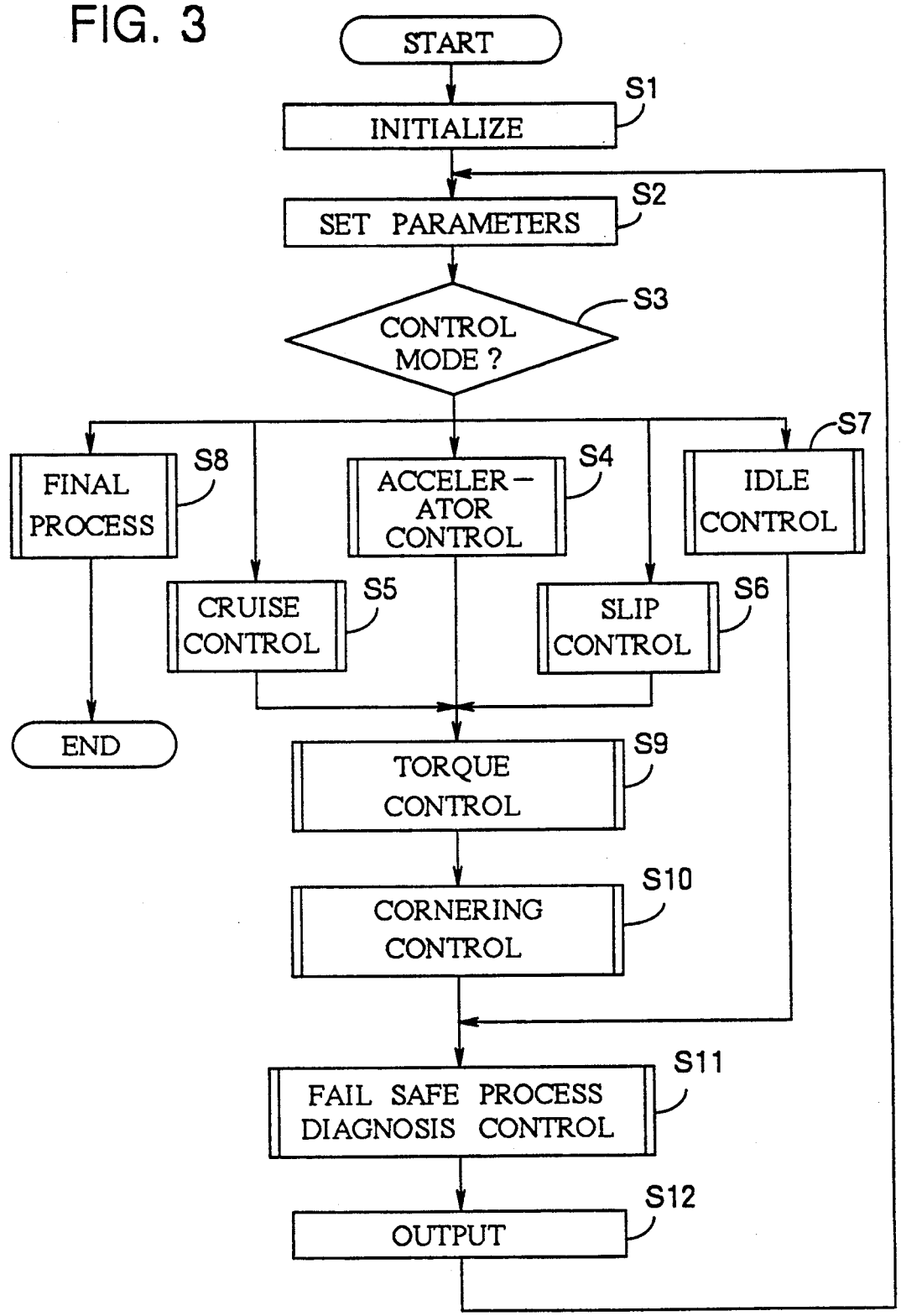
FIG. 3 is a flow chart which shows an operation of the main program of the present invention.

FIG. 3 is a flow chart which shows an operation of the main program of the present invention.

The system initializes in step S1 and sets the parameters in step S2. The system chooses the step from the steps S4-S8 in accordance with the signals in step S3. If the system chooses the steps S4, S5 or S6, the system controls the torque in step S9 and the cornering in step S10. In step S7 the system controls the idling condition in constant and in step S8 the system controls the conditions after the ignition switch 5 is turned off. In step S11 the system checks with the system for fail safe and diagnosis. The system outputs the signals in the step S12. These steps repeat in a predetermined period of time.

Referring to step S4, the accelerator control is explained. When the accelerator pedal 7 is not operated, the throttle valve 9 opens fully and the coil 3 of the electric clutch mechanism 2 is turned on by the first power control circuit 25. When the coil 3 is turned on, the motor 4 is connected to the throttle shaft through the clutch plate. The throttle shaft is controlled by the motor 4. When the accelerator pedal 7 is operated, the accelerator sensor 6 detects the angle of the operation and sends the signal to the control circuit 1. The control circuit 1 calculates a throttle valve opening. If the throttle valve 9 operates in malfunction, the throttle controller 40 releases the first power circuit 25 to cut the power to the coil 3 off. The clutch mechanism 2 is released and the throttle valve returns to the initial position by the spring (not shown).

Referring to the step S4, the cruise control is explained.

As shown in FIG. 1, after the normal open switch 11a of the main switch 11 is operated, the relay 11c is energized by the normal open switch 11b. If the throttle valve 9 opens more than a predetermined angle, the first power circuit 25 is opened when the accelerator pedal is released. While the cruise control is operating, however, the power to the coil 3 still is supplied by the second power circuit 24 to connect the motor with the throttle shaft. Thus the cruise control is kept in operation. The target throttle angle $\theta$ is calculated in accordance with the actual speed detected by the speed sensor 13 and the speed set by the set switch ST. The motor 4 is controlled to meet the target throttle angle $\theta$.

If the accelerator pedal 7 is operated to obtain the acceleration by the driver during the cruise control operation and such pedal operation is greater than the operation set by the target throttle angle $\theta$, the pedal operation overrides the system.

If the cancel switch CA of the control switch 12 is operated or the main switch 11 is turned off, the second power circuit 24 is opened to cancel the cruise control. The ignition switch 5 also cancels the cruise control. When the brake pedal is operated by the driver, the normal open switch 23 is turned off by the brake switch 21 to turn off the second power circuit 24. The first power circuit 25 allows the system to go back to the normal operation.

Referring to the step S6, the slip control is explained.

When a slip of the driving wheels is detected during the start of the vehicle or the acceleration of the vehicle by the signal of the speed sensor 13, the system goes to the slip control routine to control the throttle valve 9. The control circuit 1 calculates a desired slip ratio of the driving wheels and a target throttle opening $\theta$ to accomplish the desired slip ratio. The motor 4 controls the throttle valve 9 to be at the target opening $\theta$. When a slip ratio becomes smaller than a predetermined ratio and a target throttle opening $\theta$ becomes bigger than a predetermined opening $\theta$, the slip control ends the control and the system goes back to the normal control. While the system controls the slip control, the motor 4 controls the throttle valve 9. Therefore there is no shock when the system changes a control between the slip control and the normal control.

When a target throttle opening $\theta$ detected by the throttle sensor 8 and an operation of the accelerator pedal 7 detected by the accelerator sensor 6 become smaller than the predetermined values, the system goes to the idle control routine shown in step S7. The motor 4 is controlled to set the engine revolution at a target revolution in accordance with an engine coolant temperature and an engine load.

Figure 4:
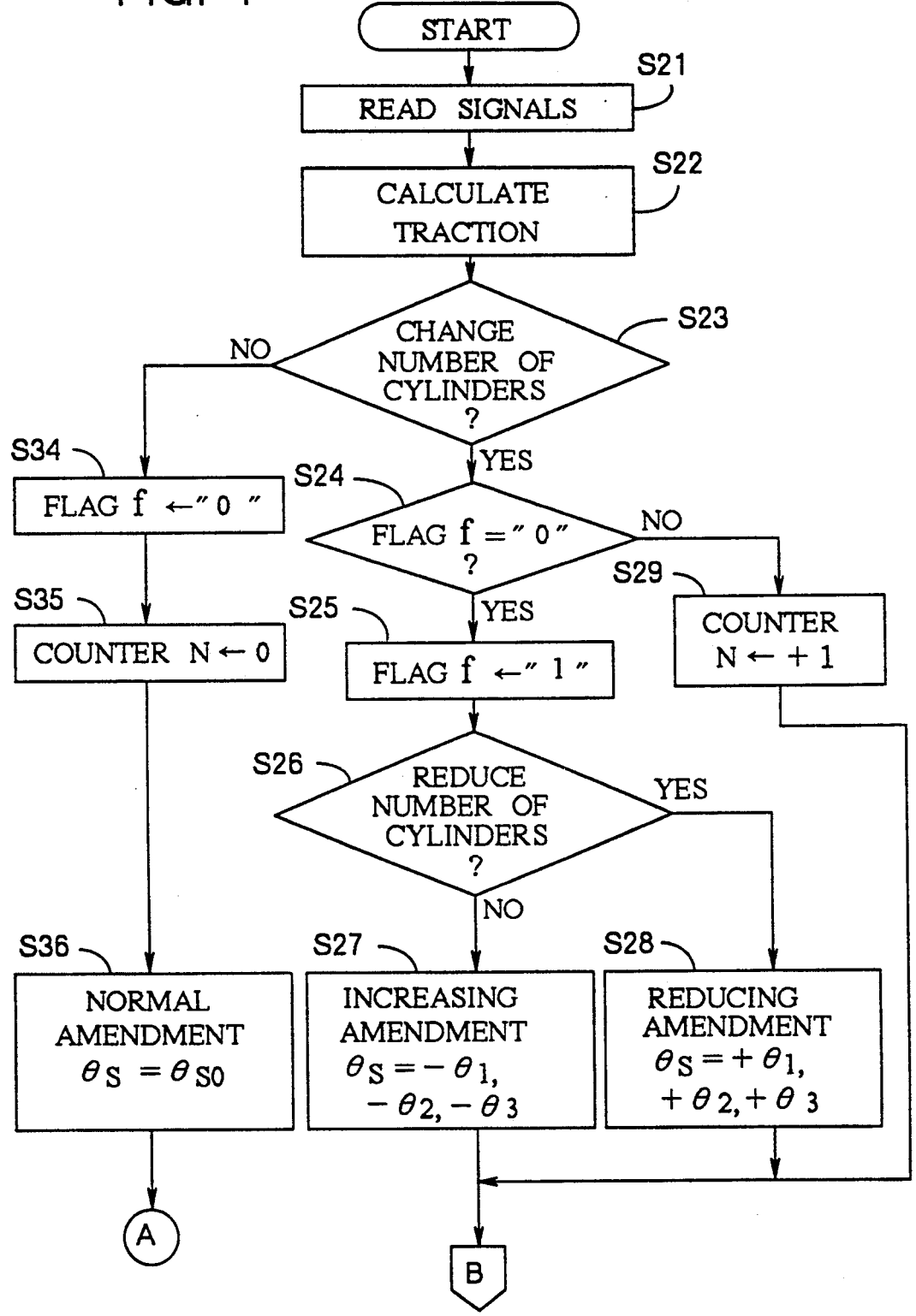
FIG. 4 is a flow chart which shows an operation of the torque control program of the present invention.
Figure 5:
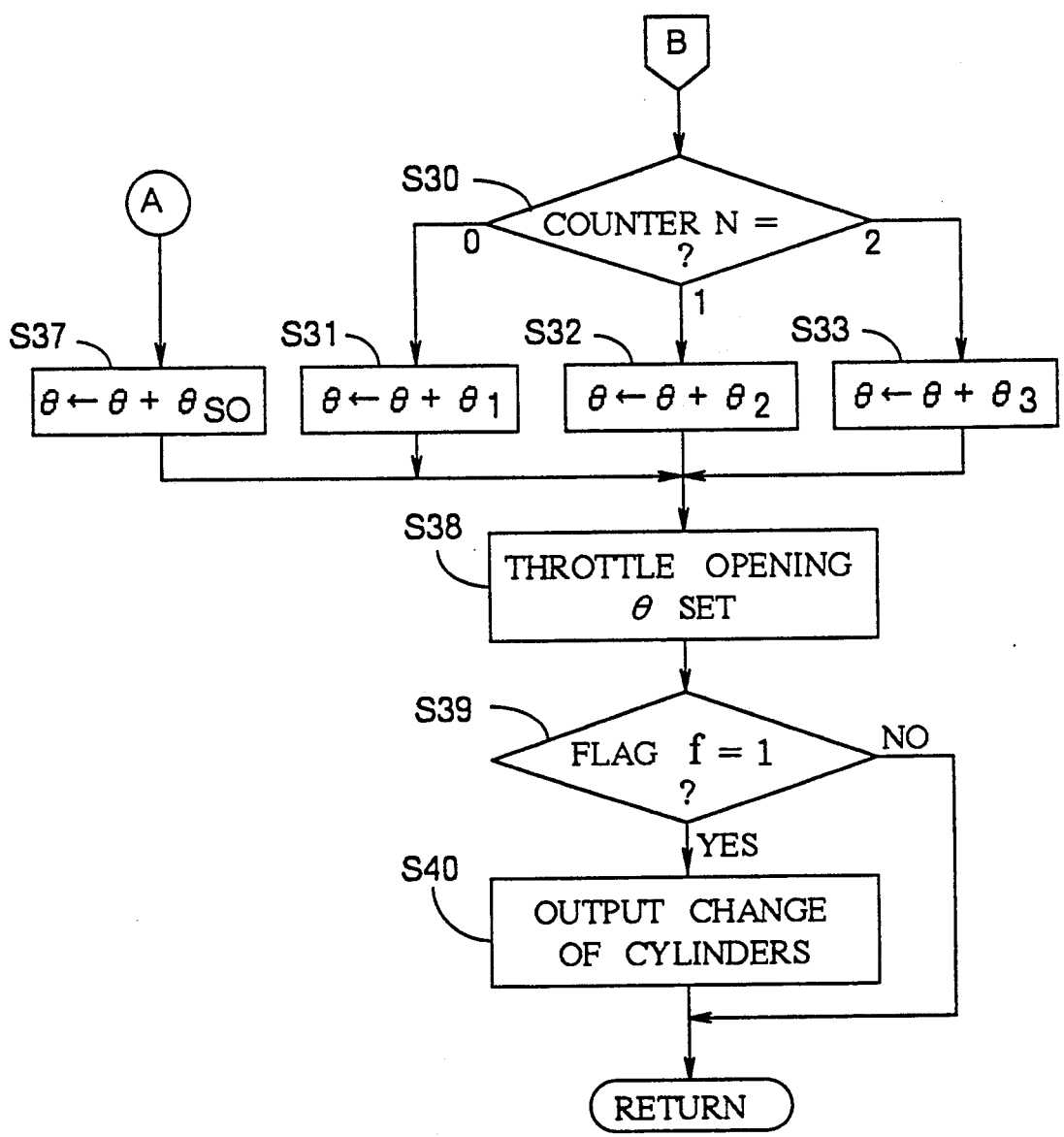
FIG. 5 is a flow chart which shows an operation of the torque control program of the present invention.

FIGS. 4 and 5 are flow charts show a torque control routine of the present invention. This routine shows that the system controls the engine in the three stages of a variable displacement. This invention, however, may be set in other number of stages of a variable displacement.

In step S21, the system reads an output of the engine output torque sensor 29, a position of the shift lever 17 of the automatic transmission 16, a signal of the speed sensor 13 to calculate a present condition. The system reads a throttle opening $\theta_0$ and an engine revolution $n_0$ by the ignition signals of the igniter 14 to calculate an amendment value for a variable displacement control. The tire diameters and transmission efficiency, etc. used for calculations are memorized in a memory of the control circuit 1.

In step S23 the system decides whether a change of the number of the cylinders is necessary, for example, a change from 8 cylinders to 4 cylinders, a change from 4 cylinders to 8 cylinders or keeping the condition. When the system decides a change is necessary in step S23, the system checks the flag f in step S24 if the system decides a change in the first time of the routine. When the flag f is "0", the system set the flag "1" in step S25. This indicates that the system has processed in the routine already. In step S26, the system checks whether a necessary change is to reduce the number of the active cylinders. If the answer is "no" in step S26, the system goes to step S27. In step S27, the system picks up a cylinder resume amendment value $\theta s = -\theta_1, -\theta_2, -\theta_3$ from the memory map in the control circuit 1 which stores the characteristics in accordance with the throttle opening $\theta_0$ and the engine revolution $n_0$. If the answer is "yes" in step S26, the system goes to step S28. In step S28, the system picks up a cylinder resume amendment value $\theta s = +\theta_1, +\theta_2, +\theta_3$ from the memory map in the control circuit 1 which stores the characteristics in accordance with the throttle opening $\theta$ and the engine revolution n. When the system detects the flag f is "1" in step S24, the system goes to step S29 and increments the counter N by 1. The system goes to step S30 to check the counter N. When the system increases the number of the cylinders and the counter N shows "0", a target throttle opening $\theta$ is calculated in the formula of $\theta = \theta + \theta_1 = \theta + (-\theta_1) = \theta - \theta_1$ in step S31. When the counter N shows "1", a target throttle opening $\theta$ is calculated in the formula of $\theta = \theta + \theta_2 = \theta + (-\theta_2) = \theta - \theta_2$ in step S32. When the counter N shows "2", a target throttle opening $\theta$ is calculated in the formula of $\theta = \theta + \theta_3 = \theta + (-\theta_3) = \theta - \theta_3$ in step S33. The system controls the throttle to reduce the opening so that the engine power is reduced before the number of the active cylinders is increased.

When the system reduces the number of the cylinders and the counter N shows "0", a target throttle opening $\theta$ is calculated in the formula of $\theta = \theta + \theta_1 = \theta + (+\theta_1) = \theta + \theta_1$ in step S31. When the counter N shows "1", a target throttle opening $\theta$ is calculated in the formula of $\theta = \theta + \theta_2 = \theta + (+\theta_2) = \theta + \theta_2$ in step S32. When the counter N shows "2", a target throttle opening $\theta$ is calculated in the formula of $\theta = \theta + \theta_3 = \theta + (+\theta_3) = \theta + \theta_3$ in step S33. The system controls the throttle to increase the opening so that the engine power is increased before the number of the active cylinders is reduced.

The system sets the target opening $\theta$ calculated in the steps S31, S32, or S33. In step S39 the system checks the flag f whether the flag f is "1". If the flag f is "1", the system outputs the change of the cylinders in step S40 e.g., via the control valve 43 so that the number of active cylinders coincides with that selected at step S23.

When the system decides that no change of the cylinders is necessary in step S23, the system sets "0" in the flag f in step S34 and clears the counter N in step S35. The system sets the normal amendment value $\theta s = \theta s_0$ in step S36. In step S37, a target throttle opening $\theta$ is set in the formula of $\theta = \theta + \theta s_0$.

The system reduces the number of the cylinders by cut off the fuel delivery to the certain cylinders when the engine shows a less load. When the engine shows more load, the system increases the number of the cylinders.

In accordance with the present invention, the system picks up an amendment value $\theta s$ from the memory map to amend the target throttle opening $\theta$ so that the system keeps the same engine power as the system changes the number of the cylinders. The system further amends the target throttle opening $\theta$ by an amendment value $\theta s$ after a change occurs. Thus the system prevents an overshoot or an undershoot of the control. The system also prevents a shock from occurring during the change. This improves a fuel efficiency and driving comforts.

In this embodiment, the system sets the target throttle opening $\theta$ and then outputs the cylinder change signal. This may be done at the same time.

The system provides amendment values to output. This amendment value may be a single value. When the system provides a single amendment value, the control will be simple. When the system provides some amendment values, the control will be sophisticated so that the system prevents shocks almost perfectly.

In accordance with the system, the throttle valve 9 is controlled by the motor. This eliminates the rinks which could cause a mechanical error or problem.

The invention has been described in an illustrative manner, and it is to be understood that the terminology which has been used in intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A control system for a variable displacement engine having a plurality of cylinders supplied with air by an air intake system having a throttle valve, said control system comprising:

means for selectively deactivating at least one of said cylinders;

means for deciding on a number of active cylinders as a function of an engine load, and for controlling the means for selectively deactivating such that a number of active cylinders coincides with a decided number of active cylinders; and means for controlling the throttle valve so as to reduce shock as the number of active cylinders is changed by decreasing the opening of the throttle valve when the deciding means decides to increase the number of active cylinders, and increasing the opening of the throttle valve when the deciding means decides to decrease the number of active cylinders, said controlling means acting to control the throttle valve before the number of active cylinders is changed by the means for selectively deactivating.

2. Apparatus according to claim 1, wherein said means for controlling the throttle valve is independent of an accelerator pedal.

3. The system of claim 1 wherein said means for controlling the throttle valve comprise:

means for setting a throttle valve opening independent of a change in the number of active cylinders; and means for setting an amendment value to the throttle valve opening as a function of a change in the number of active cylinders.

4. Apparatus according to claim 3, wherein said means for setting an amendment value sets a plurality of amendment values.

5. The system of claim 1 including means for detecting an engine load.

6. A control system for a variable displacement engine having a plurality of cylinders supplied with air by an air intake system having a throttle valve, said control system comprising:

means for selectively deactivating at least one of said cylinders;

means for deciding on a number of active cylinders as a function of an engine load, and for controlling the means for selectively deactivating such that a number of active cylinders coincides with a decided number of active cylinders; and means for controlling the throttle valve so as to reduce shock as the number of active cylinders is changed by decreasing the opening of the throttle valve when the deciding means decides to increase the number of active cylinders, and increasing the opening of the throttle valve when the deciding means decides to decrease the number of active cylinders, said controlling means acting to control the throttle valve before the number of active cylinders is changed by the means for selectively deactivating, said controlling means being independent of an accelerator pedal, and said controlling means comprising means for setting a throttle value opening independent of a change in the number of active cylinders, means for setting an amendment value to the throttle valve opening as a function of a change in the number of active cylinders.

* * * * *